3,663,496
ABLATIVE COMPOSITION COMPRISING RUBBER, RESIN, AND FILLER
William P. Whelan, Wayne, N.J., assignor to Uniroyal, Inc., New York, N.Y.
No Drawing. Filed Sept. 14, 1964, Ser. No. 397,670
Int. Cl. C08g 51/08
U.S. Cl. 260—38                                  5 Claims

ABSTRACT OF THE DISCLOSURE

An ablative composition, resistant to erosion by high velocity hot gases, comprising a cured blend of rubber (e.g., 35–75% butadiene-acrylonitrile rubber), resin (e.g., correspondingly 65–25% phenol-formaldehyde resin) and particulate filler (e.g., graphite in amount of 15 to 80% of the whole mixture). Useful for making molded rocket nozzle liners.

---

This invention relates to an ablative composition comprising a phenolic resin, a rubber and a particulate graphite filler. The invention is particularly concerned with providing an easily manufactured composition of high erosion resistance when subjected to gases of extremely high temperature and high velocity.

By "high erosion resistance" we mean, in the present context, that property which is characterized by a low erosion rate, i.e. a low rate of recession of the exposed face of the material, while being subjected a high temperature environment.

A large body of prior art in the field of this invention has developed from intensive research during recent years. Refractory materials are of general interest in applications such as nozzle liners where high dimensional stability, during subjection of the material to extremely hot, high-velocity gases, is important. Pyrolytic graphite, an oriented graphite, is one of the most promising of the newer refractories. It is formed by the passage of a gaseous hydrocarbon, e.g. methane, over a hot surface (usually graphite). It is the most erosion resistant of the graphites. Used as a nozzle liner, it must be oriented edgewise to the grain in order to avoid delamination in firing. It can be made in flat plates of limited thickness and these must be bonded together with cement. Its thermal conductivity normal to the surface it is protecting is extremely high, clearly a disadvantage.

Relative to pyrolytic graphite, the materials of the present invention possess clear advantages. They are low in density, i.e. 1.5 gm./cc. as compared to 2 gm./cc. for pyrolytic graphite, are prepared by simple, conventional techniques, are preparable in thick monolithic sections as desired, and contain an ablative binder for the reduction of effective thermal conductivity.

Erosion resistant ablative materials are also of particular interest as advanced rocket nozzle liners. Phenolic resin/graphite compositions are known ablative materials of high erosion resistance. Phenolic/graphite compositions are rigid, inflexible materials. Far from being amenable to the simple mixing techniques applicable to the subject materials, they are normally prepared by impregnation of graphite cloth with resin, followed by plying by means of a suitable technique, and finally molding.

The present invention is based on the discovery of novel rubber-based, phenolic resin and graphite compositions which surprisingly exhibit unexpected low erosion rates when subjected to the action of gases at extremely high temperature and high velocity conditions. It is a remarkable advantage of the present compositions that, unlike known oriented graphite and phenolic resin/graphite compositions, the present novel materials are readily preparable by simple rubber-compounding techniques. The compositions are desirably low in density, can be molded in thick sections, and contain an ablative binder which serves to confer thermal insulative properties on the materials. The materials are also easily formable, curable, machineable, have excellent physical properties, and are highly useful. In view of their facility of preparation, moldability, machineability and physical properties, the novel compositions are useful in applications such as rocket nozzle liners and aerodynamic surfaces where a high degree of dimensional stability, during subjection of the material to extremely hot gases of high velocity, is desirable.

The novel composition comprises a material made up primarily of a rubber, a char-forming resin and a particulate graphite filler. The composition also includes, as minor ingredients, curatives and, occasionally, processing aids such as plasticizers. The composition has a high degree of processability, and relatively low density. The resultant weight saving makes the composition especially suitable for aerospace applications, where light weight is of widespread importance. It is a remarkable property of the composition that the graphite particles apparently become bound into a strong, coherent char during service. The composition of the invention displays outstandingly high erosion resistance when subjected to the action of extremely hot gases of high velocity.

In practice we prefer to use any rubber copolymer of butadiene-acrylonitrile which is compatible with ether a novolac or resole type phenolic resin, in view of the excellent physical properties exhibited by the resultant compositions. For suitable degrees of both processability and char-forming ability, it is necessary that both rubber and resin be present in the final composition. The proportions shown below represent preferred values which provide a desirable balance of physical properties and performance processability. As will be clear from the later examples, the beneficial effect of graphite on the erosion resistance of the composition is a function of the proportion of graphite present. The proportion of graphite present also affects cured physical properties and the stiffness of the uncured composition. Therefore, the less the proportion of filler, the greater is the ease with which the composition may be compounded and processed. The beneficial effect of the phenolic resin is also a function of the proportion of resin present in the composition. An optimum proportion of graphite and phenolic resin may readily be selected in any specific case from consideration of the erosion rate, physical properties and degree of processing ease desired for a particular end item. In general, the useful proportions of rubber and resin will usually fall within the following limits:

|  | Percent by weight | |
|---|---|---|
|  | Broad range | Preferred range |
| Rubber | 35 to 75 | 40 to 50. |
| Resin | 65 to 25 | 60 to 50. |

The useful proportions of rubber-resin blend and filler will usually fall within the following limits:

|  | Percent by weight | |
|---|---|---|
|  | Broad range | Preferred range |
| Rubber-resin blend | 20 to 85 | 25 to 70. |
| Filler | 80 to 15 | 75 to 30. |

The filler employed in the invention is graphite.

In one embodiment of the invention, the present composition (e.g., stock 3 or 4 of Example 1 below) is compression molded and cured in the form of a conventional rocket nozzle liner, e.g., a generally cylindrical body adapted to fit inside a rocket nozzle, and having a central passageway through which the extremely hot gases pass at high velocity.

The following examples are illustrative of the attributes of the present invention.

EXAMPLE I

The purpose of this example is to show the effect of graphite content of the composition on the erosion rate of said composition.

A masterbatch comprising the following components was mixed in a conventional manner on a rubber mill. A commercial butadiene-acrylonitrile rubber was compounded with 110 parts of a phenol-formaldehyde resin per 100 parts of rubber and 15 parts of tricresyl phosphate as the plasticizer. This mixture was then permitted to flux on a warm mill, followed by addition of 2 parts of stearic acid, 5 parts of zinc oxide, 3 parts of tetramethylthiuram disulfide, and 10 parts of hexamethylene tetramine on a cool mill. The mixture was then split into three portions to which was mixed technical grade graphite powder as shown in the table below to give stocks 1, 2 and 3. Stock 4 was mixed in a conventional manner on a cooled mill.

Stock 4 basically differs from stocks 1, 2 and 3 only in the type phenolic resin employed. Stock 4 employs a resole type resin (BKR 2620) whereas stocks 1, 2 and 3 use a novolac type resin (Durez 12686). The butadiene-acrylonitrile rubber used in stock 4, i.e. Hycar 1051, is substantially the same as that used in stocks 1, 2 and 3, i.e. Paracril 2806. Also, the zinc oxides employed are substantially equivalent.

After compounding, each stock was compression molded and cured at 330° F. for 120–135 minutes. Thereafter the cured stock was tested as a liner in multi-specimen blast tubes used in a high velocity, 5" rocket-motor test. The test results indicated below were obtained using the procedure established at ABL and described at the end of Example III.

| Stock | 1 | 2 | 3 | 4 |
|---|---|---|---|---|
| Butadiene-acrylonitrile rubber: | | | | |
| Paracril 2806 | 100 | 100 | 100 | |
| Hycar 1051 | | | | 100 |
| Phenolic resin: | | | | |
| Durez 12686, novolac type | 110 | 110 | 110 | |
| BKR 2620, resole type | | | | 120 |
| Tricresyl phosphate | 15 | 15 | 15 | |
| Stearic acid | 2 | 2 | 2 | 2 |
| Zinc oxide: | | | | |
| Kadox 17 | 5 | 5 | 5 | |
| Protox 166 | | | | 5 |
| Tetramethyl thiuram disulfide, Tuex | 3 | 3 | 3 | 3 |
| Hexamethylene tetramine | 10 | 10 | 10 | |
| Graphite | 0 | 57 | 337 | 337 |
| Rocket test, erosion rate, mils/sec | 2.9 | 1.8 | 0.0 | −0.3 |

It is concluded that the presence of graphite in the NBR/phenolic resin composition reduces the erosion rate of the composition. The greater effect on the reduction of the erosion rate is obtained with the higher loading of graphite. The results indicate, also, that either a novolac or resole type phenolic resin may be employed. In stock 4 so little erosion occurred that it failed even to compensate for the intumescence (negative erosion) of the stock tested.

EXAMPLE II

The purpose of this example is to show the effect of resin content of the compound on the erosion rate.

In this example, for stocks 6, 7, 8 and 9, the butadiene-acrylonitrile rubber was compounded with the desired proportion of phenolic resin per 100 parts of rubber and 15 parts of the tricresyl phosphate as the plasticizer. This mixture was then permitted to flux on a warm mill and was subsequently followed by addition of the remaining ingredients on a cool mill. Stock 5 was mixed in a conventional manner on a cooled rubber mill. Each stock was then compression molded at 330° F. for 135 minutes. It should be noted that the resin curative, i.e. hexamethylene tetramine, was varied in direct proportion to the amount of resin used. The weight percent of graphite was held substantially constant for each compounded stock.

Each stock so compounded was subsequently torch tested. The torch test is a more rapid and less expensive test than the rocket motor test. The torch test comprises the normal impingement of a flame onto a 2" x 2" x ¼" test panel surface. The tip of the torch is at an initial distance of ¾" from the test panel. The flame emanates from an oxyacetylene torch 4 consists of 102 std. ft.³/hr. of acetylene mixed with 123 std. ft.³/hr. of oxygen. The apparatus employed to accomplish the desired test was an Airco 0800 torch fitted with a high capacity mixer and a #10 tip.

| Stock | 5 | 6 | 7 | 8 | 9 |
|---|---|---|---|---|---|
| Butadiene-acrylonitrile rubber, Paracril 2806 | 100 | 100 | 100 | 100 | 100 |
| Phenolic resin, Durez 12686 | 0 | 37 | 73 | 110 | 147 |
| Tricresyl phosphate | 15 | 15 | 15 | 15 | 15 |
| Stearic acid | 2 | 2 | 2 | 2 | 2 |
| Zinc oxide, Kadox 17 | 5 | 5 | 5 | 5 | 5 |
| Tetramethyl thiuram disulfide, Tuex | 3 | 3 | 3 | 3 | 3 |
| Hexamethyl tetramine | 0 | 3 | 7 | 10 | 13 |
| Graphite | 183 | 233 | 285 | 337 | 387 |
| Torch test, erosion rate, mils/sec | 3.5 | 2.2 | 1.8 | 1.1 | 1.6 |

The results of Example II show that lowest erosion rates are obtained at relatively high levels of resin content.

Comparing results of Examples I and II, it may be generally stated that best results as to low erosion rates are attained in an butadiene-acrylonitrile/phenolic resin/graphite composition at relatively high levels of loading of graphite and phenolic resin in the butadiene-acrylonitrile rubber.

EXAMPLE III

The purpose of this last example is to illustrate the combination of physical properties and performance attainable with a representative series of the novel compositions. In this example, essentially the same processing and curing procedures were used as described in compounding stocks 1, 2 and 3 of Example I in making the compositions set forth in the following table. Again, after compounding, the compositions were compression molded and cured at 330° F. for 135 minutes.

| Stock | 10 | 11 | 12 | 13 | 14 |
|---|---|---|---|---|---|
| Butadiene/acrylonitrile rubber, Paracril 2806 | 100 | 100 | 100 | 100 | 100 |
| Phenolic resin, Durez 12686 | 110 | 110 | 110 | 110 | 110 |
| Tricresyl phosphate | 15 | 15 | 15 | 15 | 15 |
| Stearic acid | 2 | 2 | 2 | 2 | 2 |
| Zinc oxide, Kadox 17 | 5 | 5 | 5 | 5 | 5 |
| Tetramethyl thiuram disulfide, Tuex | 3 | 3 | 3 | 3 | 3 |
| Hexamethylene tetramine | 10 | 10 | 10 | 10 | 10 |
| Graphite | 127 | 167 | 215 | 271 | 337 |
| Physical properties: | | | | | |
| Tensile strength, p.s.i. (0.25 in./min. strain rate) | 4,240 | 4,350 | 4,460 | 4,460 | 4,400 |
| Elongation at yield, percent | 6 | 5 | 5 | 5 | 4 |
| Hardness, Shore D | 65 | 66 | 67 | 67 | 68 |
| Density, gr./cc | 1.35 | 1.40 | 1.45 | 1.50 | 1.55 |
| Rocket test, erosion rate, mils/sec | 0.9 | 0.9 | 0.7 | 0.14 | 0.6 |

The erosion rate tests were performed at Allegany Ballistics Laboratory using their standard 5" rocket-motor, high velocity test. The solid propellant motor operates at a nominal temperature of 6000° F. with an initial gas velocity of approximately 900 ft./sec. at a chamber pressure of 300±50 p.s.i.g. for a firing time of 31±6 sec. The phenolic-asbestos standard control material used (AA Spauldite, approx. density 1.8 gr./cc.) gave an erosion rate of 5.3–6.2 mils/sec. Samples for this test are cylindrical sections 2" O.D., 0.75" I.D., length 1", and are typically machined from 1" thick molded sections. Said molded sections consist of plied slabs of raw composition which are subsequently cured into a monolithic, homogeneous material. Samples are arranged so that the exhaust gases pass through the interior of the cylinders.

The data from this last example further demonstrate the extremely high erosion resistance obtainable at low densities with butadiene-acrylonitrile/phenolic resin/graphite compositions in combination with other desirable properties such as tensile strength, extensibility and hardness.

Having thus described my invention, what I claim and desire to protect by Letters Patent is:

1. Ablative composition comprising a cured mixture of butadiene-acrylonitrile rubber, phenol-formaldehyde resin, and graphite.

2. Erosion resistant composition comprising (A) a cured rubber-resin blend containing from 35 to 75% rubber, and correspondingly from 65 to 25% of resin, and (B) a particulate filler intimately admixed therewith, the said blend (A) constituting from 20 to 85% and the said filler (B) correspondingly constituting from 80 to 15% of the mixture of (A) and (B), said percentages being by weight.

3. Erosion resistant composition comprising (A) a cured rubber-resin blend containing from 40 to 50% rubber and correspondingly from 60 to 50% resin, and (B) a particulate filler intimately admixed therewith, the said blend (A) constituting from 25 to 70% and the said filler (B) correspondingly constituting from 75 to 30% of the mixture of (A) and (B), said percentages being by weight.

4. A composition as in claim 3 in which the said rubber is butadiene-acrylonitrile rubber, the said resin is a phenolic resin, and the said filler is graphite.

5. Method of making an erosion-resistant article comprising preparing an intimate mixture of rubber, phenolic resin, and graphite, and molding and curing said mixture in the shape of the desired article.

References Cited

UNITED STATES PATENTS

| | | | |
|---|---|---|---|
| 2,835,107 | 5/1958 | Ward | 60—271 |
| 3,210,233 | 10/1965 | Kummer et al. | 102—92.5 |
| 3,250,829 | 5/1966 | Wall | 264—3 |

REUBEN EPSTEIN, Primary Examiner